United States Patent [19]

Smith, Sr.

[11] Patent Number: 4,879,543
[45] Date of Patent: Nov. 7, 1989

[54] AUTOMOBILE DOOR GUARD

[76] Inventor: Leonard B. Smith, Sr., 4662 Conwell Dr., Annandale, Va. 22003

[21] Appl. No.: 201,783

[22] Filed: Jun. 3, 1988

[51] Int. Cl.$^4$ ............................................. B60Q 1/00
[52] U.S. Cl. .................................... 340/473; 293/128; 296/207
[58] Field of Search ........................... 293/1, 102, 128; 296/207; 280/770; 340/473, 468

[56] References Cited

U.S. PATENT DOCUMENTS

| | | | |
|---|---|---|---|
| 3,550,951 | 12/1970 | Cobbs | 296/207 |
| 3,582,134 | 6/1971 | Shaff | 293/128 |
| 4,810,013 | 3/1989 | Spears | 293/128 |

Primary Examiner—Joseph A. Orsino
Assistant Examiner—Jeffery A. Hofsass
Attorney, Agent, or Firm—Richard C. Litman

[57] ABSTRACT

An apparatus for protecting the finish on the door of an automobile from damage caused by someone opening the door of an automobile parked in the adjoining parking space. Secondly, the apparatus serves to protect the door of the adjacently parked automobile when the user opens his or her door. The device includes a transparent housing wherein a plurality of arcuate protective strips are deployed therein. Said arcuate protective protective strips including a guide track or channel located along the intermiate section thereof, said arcuate protective strips also including T-shaped flanges substantially depolyed along the opposite ends of each arcuate protective strip, whereby said guide track or channel and said T-shaped flanges communitively allow said plurality of said arcuate protective strips to extend along the longitudinal portion of the door of the automobile. Also provided is a tensile retention band wherein said device may be selectively retracted into said transparent housing. Pivotably affixed hook members provide axial displacement of the device between the longitudinal portion of the car door and the marginal portion of the flanged end of the car door. Furthermore, the apparatus includes a light emitting-signaling source located at the rear portion of its housing, which will notify another person that the user's door is ajar, and will also provide for directional or turn signaling during operation of the vehicle.

9 Claims, 3 Drawing Sheets

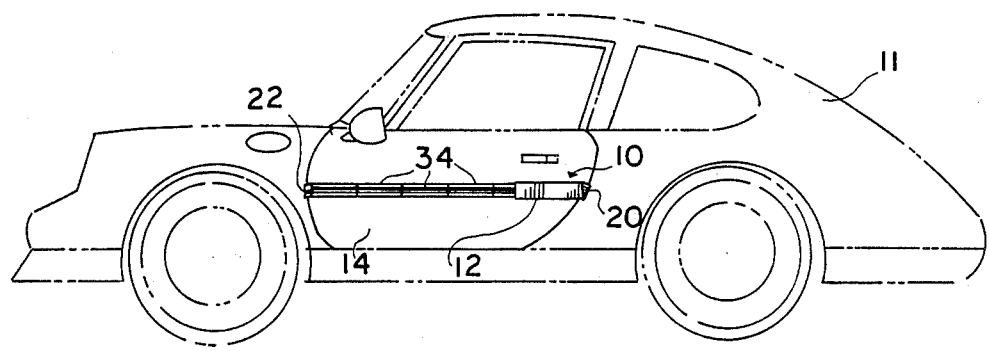
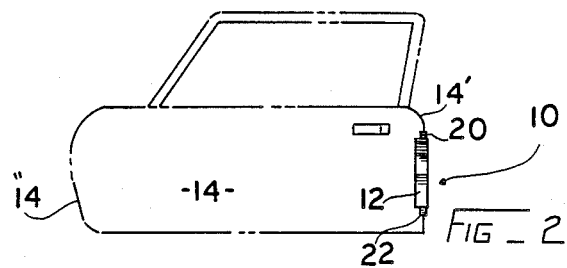
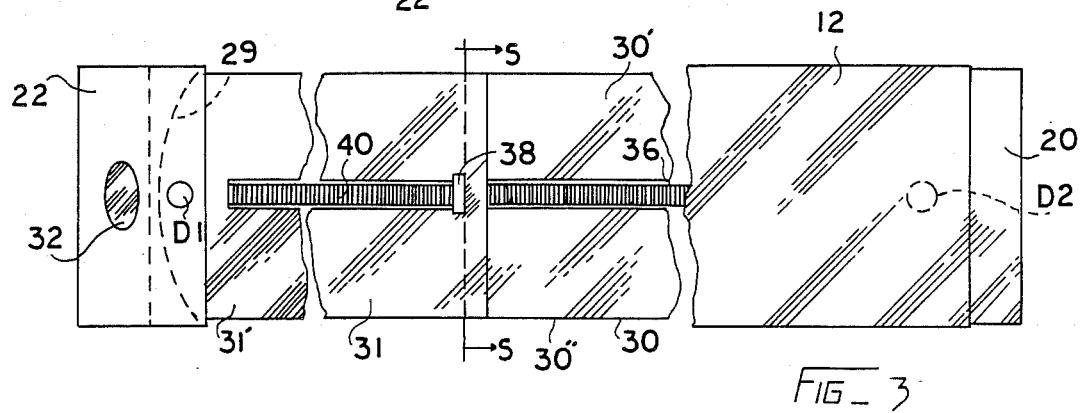
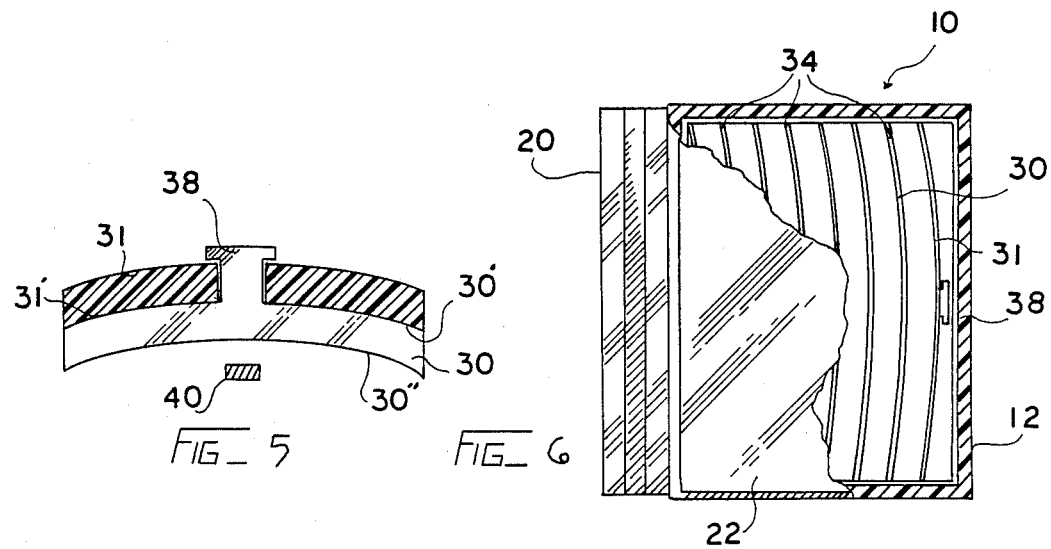

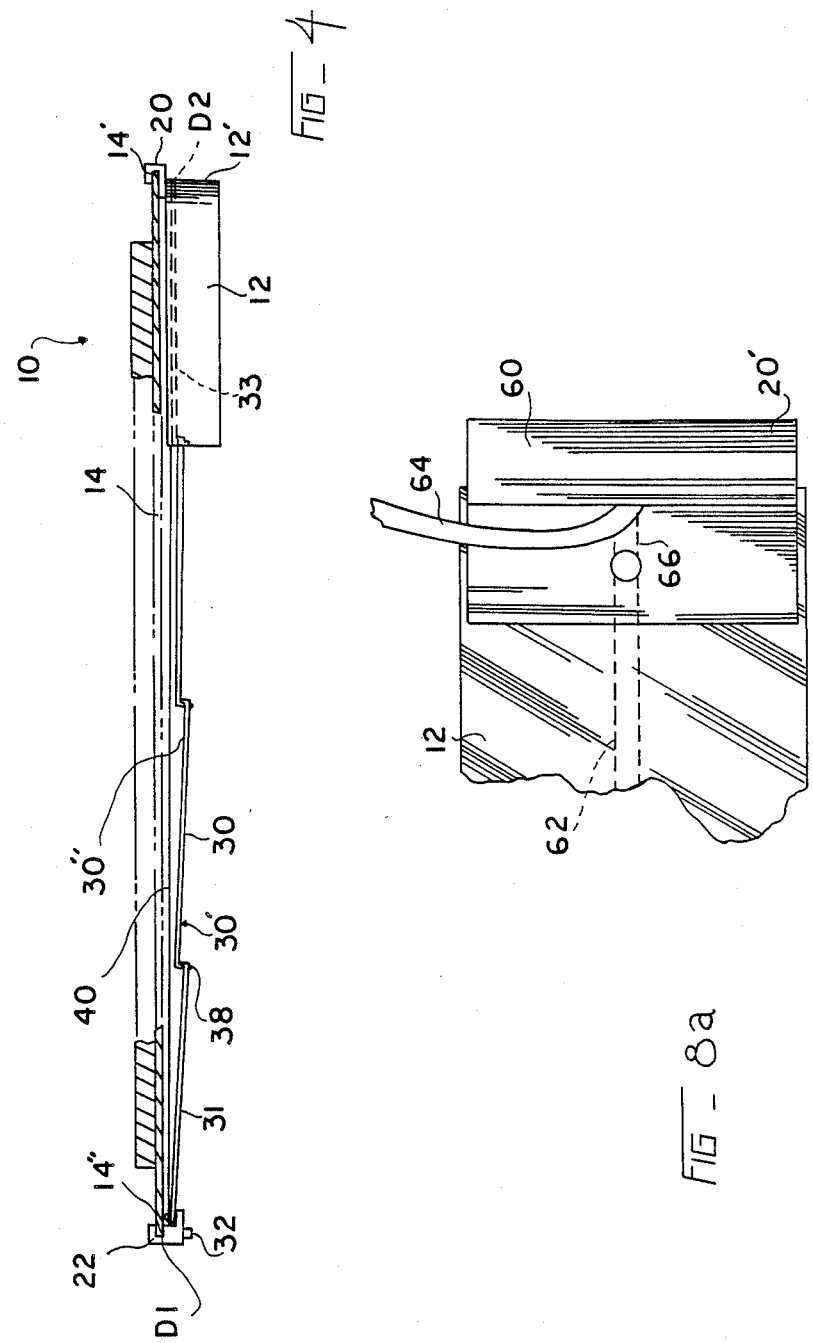

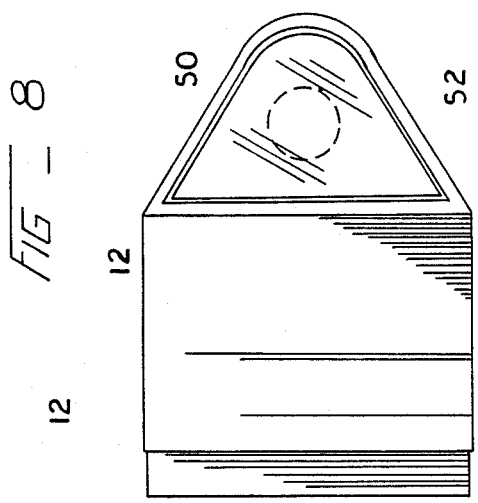
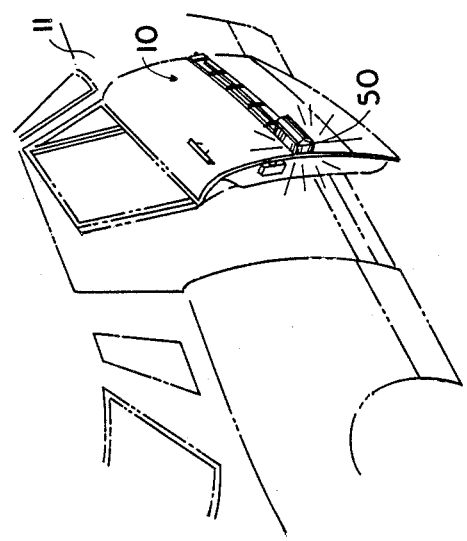
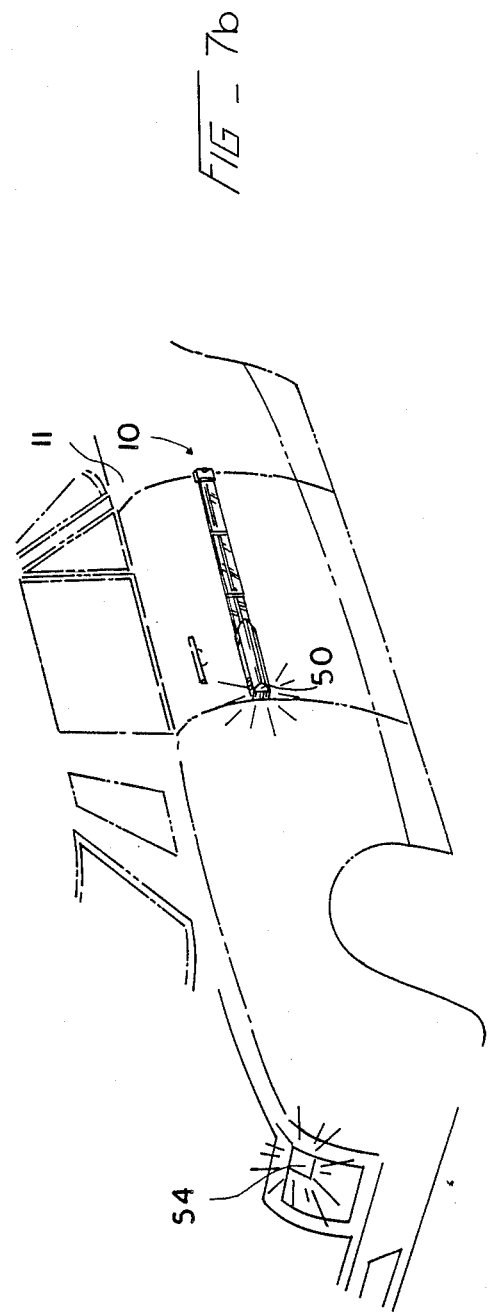

AUTOMOBILE DOOR GUARD

BACKGROUND OF THE INVENTION

The invention relates to devices for preventing body defacement to automobiles which are parked in close proximity to one another.

When automobiles are parked closely together, e.g., in the parking lots of shopping malls and grocery stores, there is a tendency for drivers to inadvertently mar or scratch the finish of an adjoining vehicle while entering or exiting their car. By the same token, a person may receive damage to his car by another closely parked car in the aforementioned fashion.

Therefore, the present invention, an automobile door guard, which is inexpensive in construction and portable by manufacture, is disclosed which may be removably secured to the user's car along the longitudinal section of the door and which provides yieldable protection for the finish of the user's automobile from marring or scratching caused by the inadvertent contact with the opening door of a closely parked car. Also, when this device is alternately secured along the free end of the user's car door in vertical deployment, the invention protects the finish of the adjoining car while the user exits his vehicle.

The method of construction of the invention is more fully described herein.

DESCRIPTION OF THE PRIOR ART

Various prior art automobile door guards and the like, as well as the method of their construction in general, are known and are found to be exemplary of the U.S. prior art. They are:

| U.S. Pat. No. | Inventor |
| --- | --- |
| 4,690,446 | M. Warren |
| 4,592,937 | Nagata Et. Al. |
| 4,531,560 | M. F. Balanky |
| 4,493,502 | Campbell. Jr. |
| 4,334,700 | R. Adell |
| 3,550,951 | A. O. Cobbs |
| 3,540,773 | B. T. Settle. Jr. |

U.S. Pat. No. 4,493,502 to Campbell, Jr. discloses a protective device which comprises a protective flexible strap having means for storing same in a rolled-up position housed in a casing, which is mounted in one of the wheel wells of a car.

U.S. Pat. No. 4,334,700 to Adell discloses a door edge guard which relates to ornamental and protective devices for the edge of an automobile door.

U.S. Pat. No. 3,550,951 to Cobbs discloses a flexible motor vehicle door guard which frictionally attaches to the outer flanged portion of an automobile.

The remaining patents disclose various fixed and retractable vehicle door guard protection systems.

These patents, or known prior uses, teach and disclose various types of devices for protecting the finish on automobiles, as well as methods of their construction; but none of them, whether taken singly or in combination disclose the specific details of the combination of the invention as to bear upon the claims of the present invention.

SUMMARY OF THE INVENTION

An object of the present invention is to provide an automobile door guard which is safe in use and provides means for preventing marring or scratching to the finish of the user's door, caused by someone hitting same while entering or exiting a car parked in an adjoining parking space.

Another object of the invention is to provide an apparatus that is safe in use and provides means for preventing damage to the finish of an automobile which is parked in an adjoining parking space, wherein damage may be caused while the user of the device is exiting his or her car and inadvertently hits the adjoining vehicle with their door.

A further object of the present invention is to provide a device which is frictionally affixed along the longitudinal section of an automobile and may also be frictionally affixed along the vertical flanged portion of the free end of said door.

A still further object of the present invention is to provide a protective device which is portable, whereby the device may be easily removed and temporarily stored in the user's car, e.g., the glove compartment.

Another still further object of the present invention is to provide an apparatus that will alert other drivers of the intended movement of the user's automobile during operation thereof, and will also indicate when the user's door is ajar during egress from the automobile.

With these and other objects in view which will more readily appear as the nature of the invention is better understood, the invention consists in the novel construction, combination and arrangements of parts hereinafter more fully described, illustrated and claimed, with reference being made to the appended drawings.

BRIEF DESCRIPTION OF THE DRAWINGS

FIG. 1 is a front elevational view of the device extended and frictionally attached to the hinged end and to the free end of the door of an automobile.

FIG. 2 is a front elevational view of the device frictionally attached along the free end of an automobile door with the device illustrated in its retracted deployment.

FIG. 3 is an enlarged view of a fragmentary portion of the device as seen in FIG. 1, illustrating the juxtapositioned arrangement of the arcuate protective strips, along with the extending and retracting components of the present invention.

FIG. 4 is a top elevational view of the device illustrating the frictional engagement of the device at the hinged end and free end of the automobile door.

FIG. 5 is a cross sectional view along 5—5 of FIG. 3 illustrating the guiding assembly of the juxtapositionally arranged arcuate protective strips.

FIG. 6 is a front end elevational view including portions cut-away to illustrate the nesting arrangement of the arcuate protective strips of the device.

FIG. 7a is a perspective view illustrating an alternative embodiment of the invention, wherein a fragmentary representation of an automobile is shown. Herein, the apparatus includes signaling means thereon for indicating that the door is open.

FIG. 7b is a perspective view similar to FIG. 7a, wherein the rear signal light of the automobile and the lighting element of the invention simultaneously provide intermittent turn or directional signals.

FIG. 8 is a side plan view of the rear of the housing member illustrating the light emitting element (shown in dashed lines) of the invention.

FIG. 8a is an enlarged front elevation view (illustrating a fragmentary portion) of one of the door gripping members of the invention, wherein lead wires for electrical conduction are provided.

PREFERRED EMBODIMENT

Referring now to the drawings, there is shown in FIGS. 1 and 2 the device 10 in accordance with its preferred embodiment and best mode of the invention. FIG. 1 illustrates the protective strips 34 longitudinally disposed along one door 14 of an automobile 11. In order to provide the greatest amount of protection for the user's car 11, the device is secured to the door 14 at the greatest prominence of convexity thereof. Similarly as seen in FIG. 2, the device 10 is vertically disposed intermediately along the free end 14' of the door, thus during the opening of the user's car door, the device 10 provides a greater degree of protection for an automobile parked in an adjacent space.

FIG. 3 illustrates the extending and retracting components of the device 10, wherein yieldable protective strips 30, 31 include a channel or groove 36 substantially disposed between the end segments of each protective strip 30, 31. As seen in FIGS. 4 and 5, "T"-shaped guiding member 38 protrudes from upper surface 30' and lower surface 30", respectively of each protective strip at the front and rear portions thereof. Except for the primary protective strip member 31 and the terminal protective strip member 33, the arrangement of each "T"-shaped member and channel member 36 allows the device 10 to be longitudinally extended from a collapsed condition, to the extent of the exterior of the door 14, between the free end 14' and the hinged end 14" of same. Static rigidity between the primary protective strip 31 and the terminal protective strip 33 is continuously provided during free standing longitudinal displacement of the protective strips. The "T"-shaped guiding members 38 of each protective strip cooperatively engage and slide between the channel member 36 of the respective adjacent strips. Facilitating this longitudinal displacement is elastic retaining and retracting member 40. The retaining and retracting member 40 is rigidly affixed intermediate the distal portion of the lower surface 31' of the primary yieldable protective strip at "D1" (FIG. 2), and is also rigidly affixed intermediate the distal portion of the lower surface of the terminal protective strip 33 at "D2". To further illustrate the aforementioned, FIG. 4 shows the device 10 extendably deployed. Wherein a tensile retaining force is sustained during the frictional attachment of the two swivel clip members 20, 22 which are engaged along the hinged end 14" and free end 14' of the door. Also, the yieldable protective strip members 34 have an arcuate shape, providing a semi-tubular protective device during extended deployment of the device.

Housing 12 encases the arcuate protective strips in an arrangement similar to FIG. 6. Herein, the elastic forces produced by applying a load on pull-tab 32 (FIG. 3) are no longer at an intensity which provides for longitudinal extension of same, therefore the protective strips are now in retracted deployment, which can be seen to provide a juxtaposed arrangement of members 30, 31 nested in the housing 12. As seen in FIG. 3, while the protective strips are disposed within the housing 12, the device 10 may be vertically deployed along the free end 14' of the door 14. A pair of pivotably affixed clips 20 and 22 respectively, provide for a 90 degree displacement of the device 10. Convex shaped end 29 of the primary member 31 provides for unrestricted swiveling or pivoting displacement of first clip 22, which along with the second pivotably affixed clip 20 disposed along the back portion of the housing, provides unrestricted movement of the device 10 as it rotates between a horizontal position and vertical position.

When the protective device is mounted on both sides of an automobile, it serves to prevent marring or scratching of the user's automobile which may occur while someone parked in an adjoining parking space opens the door of their car.

Alternatively, as seen in FIG. 7a and 7b, the device 10 includes a signaling element 50 juxtapositionally disposed at rear portion 12' of the housing 12. The signaling element 50 of the invention along with the existing electrical turn signals of the automobile, simultaneously provide intermittent turn or directional signals (as seen in FIG. 7b). Secondly, (as seen in FIG. 7a) during egress from the automobile 11, the device 10 emits a continuous source of light (similar to the interior light located on the ceiling of the automobile, now shown).

In the aforementioned alternate embodiment, (as seen in FIG. 8a) the door gripping member 60 is seen to include a conductive material 62, e.g., a thin copper strip, interiorly disposed therein, which provides electrical communication for the light transmitting element, thus allowing same to interface with the existing electrical (warning/directional) system of the automobile. Male 64 and female 66 electrical connector members are provided within the rear door gripping element 20' providing integral coupling means therefore. The light transmitting element may include an amber coloured tint or filter member 52 placed at the rear portion 12' of the housing, so as to emit a discernible signal for those driving or parking in close proximity to the user's automobile 11.

In accordance to the objects of the invention, upon removing the second pivotably affixed swivel clip 22 from the hinged end 14" of the door 14, the tensile forces of the elastic member 40 allow the plurality of protective strip members 34 to slidably retract along the channels of each member, thus disposing the protective strips in a juxtaposed manner (FIG. 6). The elastic member 40 also retains the arcuate protective strips 34 within the housing 12 during removal from the car. At this point the user would place the second swivel clip 22 along the free end 14' of the door, in a manner similar to the frictional engagement of the first swivel clip member 20. Herein, the device (as seen in FIG. 2) is disposed intermediately upon the flanged or free end of the door 14'. In this manner, as the user opens the door of his or her automobile, the portion which most often makes contact is the intermediate segment of the free end of a door.

The displacement of the device from a horizontal position to a vertical position, and vice versa, is facilitated by pull-tab member 32, wherein as the user extends or retracts the plurality of arcuate protective strips he simply grasps the pull-tab member 32 and manually directs the first or primary protective strip member 31, thereby either horizontally or vertically displacing the device.

Upon dislodging of the device 10 from the door 14, the device may be placed in the glove compartment for storage thereof. Also while the device is secured to the closed car door, the swivel clips 20, 22 limit the extent of vandalism and prevent unwarranted removal of the device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. A protective device for removable attachment alternatively to the free end or between the free end and the hinged end of the exterior of an automobile door comprising:

A plurality of longitudinally displaceable protective strips including at least a primary protective strip member and a terminal protective strip member;

a cushioned housing member including at least a front portion and a rear portion, said terminal protective strip member rigidly affixed within said cushioned housing member, said cushioned housing member providing encasing means for said plurality of protective strips, door gripping means pivotably attached to said primary protective strip and said rear portion of said housing for engaging said door either by both door gripping means attached to the free end, or the gripping means attached to opposite edges of said door, channel means disposed throughout said plurality of protective strips and including yieldable retention means, spanning said protective strips, whereby upon longitudinally extending said plurality of protective strips, said protective device is attachable to said door, thus providing protection thereto.

2. The protective device of claim 1 wherein, upon engaging said gripping means on said free end of said door, such that said device is vertically disposed along said free end of said door, said cushioned housing member of said protective device thereby preventing body defacement to other cars, which are parked in adjoining parking spaces.

3. The protective device of claim 1 wherein, said plurality of protective strips include yieldable arcuate members providing semi-tubular protective means during longitudinal extension of said plurality of protective strips.

4. The protective device of claim 1 wherein, said yieldable retention means including elastic retaining and retracting means facilitating said longitudinal displacement of said protective strip members.

5. A protective device for removable attachment alternatively to the free end or between the free end and the hinged end of the exterior of an automobile door comprising:

a plurality of longitudinally displaceable protective strips including at least a primary protective strip member and a terminal protective strip member;

a cushioned housing member including at least a front portion and a rear portion, said terminal protective strip member rigidly affixed within said cushioned housing member, said cushioned housing member providing encasing means for said plurality of protective strips, channel means disposed throughout said plurality of protective strips and including yieldable retention means, spanning said protective strips, door gripping means pivotably attached to said primary protective strip and said rear portion of said housing for engaging said door at either the edge at the free end or opposite edges at the free end and hinged end thereof, a light transmitting element disposed adjacent said rear portion of said cushioned housing member providing signaling means for said automobile during operation thereof, said light transmitting element including means for communicating with an existing electrical system of said automobile.

6. The protective device of claim 5 wherein, said signaling means provides illumination of said light transmitting element actuated by the opening of said automobile door.

7. The protective device of claim 5 wherein, said signaling means provides intermittent illumination of said light transmitting element actuated by said existing electrical system of said automobile.

8. The protective device of claim 5 wherein, said signaling means includes light filter means located adjacent said light transmitting element, thus providing standard turn signal coloration thereon.

9. The protective device of claim 5 wherein, said door gripping means includes conductive material interiorly disposed therein, thus providing electrical communication for said light transmitting element.

* * * * *